United States Patent
Lee et al.

(10) Patent No.: US 7,711,318 B2
(45) Date of Patent: May 4, 2010

(54) APPARATUS AND METHOD FOR RELAYING NEIGHBOR BASE STATION INFORMATION IN A MULTI-HOP RELAY WIRELESS ACCESS COMMUNICATION SYSTEM

(75) Inventors: Sung-Jin Lee, Seoul (KR); Pan-Yuh Joo, Seoul (KR); Jung-Je Son, Seongnam-si (KR); Jae-Weon Cho, Suwon-si (KR); Hyoung-Kyu Lim, Seoul (KR); Yeong-Moon Son, Anyang-si (KR); Mi-Hyun Lee, Seoul (KR); Hyun-Jeong Kang, Seoul (KR); Song-Nam Hong, Seoul (KR); Young-Ho Kim, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 764 days.

(21) Appl. No.: 11/520,126

(22) Filed: Sep. 13, 2006

(65) Prior Publication Data

US 2007/0060049 A1    Mar. 15, 2007

(30) Foreign Application Priority Data

Sep. 13, 2005    (KR)    ...................... 10-2005-0085447

(51) Int. Cl.
*H04B 7/15*    (2006.01)
(52) U.S. Cl. ..................................... 455/11.1; 455/436
(58) Field of Classification Search ................. 455/513, 455/115.3, 436, 437, 439, 438, 432.1, 7, 455/11.1, 13.1, 15, 442

See application file for complete search history.

(56) References Cited

U.S. PATENT DOCUMENTS

| 6,718,158 B1 * | 4/2004 | Suonvieri ...................... 455/9 |
| 2004/0152480 A1 * | 8/2004 | Willars et al. ................ 455/513 |
| 2006/0003696 A1 * | 1/2006 | Diaz Cervera et al. ..... 455/11.1 |

* cited by examiner

*Primary Examiner*—Tu X Nguyen
(74) *Attorney, Agent, or Firm*—The Farrell Law Firm, LLP

(57) ABSTRACT

An apparatus and method for relaying neighbor BS in a multi-hop relay broadband wireless access (BWA) communication system are provided. In the BWA communication system, a BS transmits a neighbor BS advertisement message to a relay station (RS) within a cell area of the BS. The RS configures a relay neighbor BS advertisement message by eliminating unavailable neighbor BS information from the neighbor BS advertisement message, and broadcasts the relay neighbor BS advertisement message in a cell area of the RS.

12 Claims, 6 Drawing Sheets

APPARATUS AND METHOD FOR RELAYING NEIGHBOR BASE STATION INFORMATION IN A MULTI-HOP RELAY WIRELESS ACCESS COMMUNICATION SYSTEM

PRIORITY

This application claims priority under 35 U.S.C. § 119 to an application filed in the Korean Intellectual Property Office on Sep. 13, 2005 and assigned Serial No. 2005-85447, the contents of which are incorporated herein by reference.

BACKGROUND OF THE INVENTION

1. Field of the Invention

The present invention relates generally to relaying information in a communication system, and in particular to an apparatus and method for reconfiguring and broadcasting a neighbor Base Station (BS) advertisement message received from a serving BS by a relay station in a multi-hop relay Broadband Wireless Access (BWA) communication system.

2. Description of the Related Art

Currently, active research is being conducted to provide services with diverse Quality of Service (QoS) levels at about 100 Mbps to users in the $4^{th}$ Generation (4G) communication system. Particularly, there is active research being conducted on providing high-speed service by ensuring mobility and QoS to a BWA communication system such as Wireless Local Area Network (WLAN) and Wireless Metropolitan Area Network (WMAN). Examples of such research are Institute of Electrical and Electronics Engineers (IEEE) 802.16d and IEEE 802.16e.

The IEEE 802.16d and IEEE 802.16e communication systems are implemented by applying Orthogonal Frequency Division Multiplexing (OFDM)/Orthogonal Frequency Division Multiple Access (OFDMA) to physical channels of the WMAN system. IEEE 802.16d considers only a single-cell structure with no regard to mobility of Subscriber Stations (SSs). In contrast, IEEE 802.16e supports the SS' mobility to the IEEE 802.16d communication system. A mobile SS is called a Mobile Station (MS) or a Mobile Subscriber Station (MSS).

FIG. 1 illustrates the configuration of the conventional IEEE 802.16e communication system, configured in a multi-cell structure. Specifically, the system includes cells 100 and 150, base stations (BSs) 110 and 140 for managing the cells 100 and 150, respectively, and a plurality of MSs 111, 113, 130, 151 and 153. Signals are sent and received between the BSs 110 and 140 and the MSs 111, 113, 130, 151 and 153 in OFDM/OFDMA. The MS 130 exists in a cell boundary area between the cells 100 and 150, i.e. in a handover region. When the MS 130 moves to the cell 150 managed by the BS 140 during signal transmission/reception to/from the BS 110, the serving BS of the MS 130 changes from the BS 110 to the BS 140.

FIG. 2 illustrates an operation in a serving cell for broadcasting a Mobile_Neighbor-Advertisement (MOB_NBR-ADV) message in a cell in the conventional IEEE 802.16e communication system.

Referring to FIG. 2, a serving BS 210 collects information about its neighbor BSs 220 to 290 by communicating with them over a wired or wireless backbone network, and periodically broadcasts the neighbor BS information in a cell by a MOB_NBR-ADV message 214. Since the MOB_NBR-ADV message 214 is not intended for an MS at a particular location or in a particular direction within the cell, but is directed to all MSs within the cell, it delivers the neighbor BS information omni-directionally. An MS 212 recognizes the presence of the neighbor BSs 220 to 290 as well as the serving BS 210 by the MOB_NBR-ADV message 214. If the MS 212 is at a cell boundary between the serving BS 210 and the neighbor BS 230 as illustrated in FIG. 2, it does not need information about neighbor BSs in the opposite direction to the cell coverage, such as the neighbor BS 270. However, the serving BS 210 does not target the particular MS 212 in transmitting the neighbor BS information, and thus broadcasts the MOB_NBR-ADV message 214 across the cell. Although the MS 212 receives information about all of the neighbor BSs 220 to 290, it does not need information about the neighbor BSs 260 to 290 because they are not around the MS 212.

FIG. 3 illustrates a conventional multi-hop relay broadband wireless communication system. Referring to FIG. 3, an MS 309 is located at a cell boundary of a BS 301, though within the coverage area of the BS 301. Therefore, the MS 309 can receive a service from the serving BS 301 but with poor quality due to the distance constraint. Compared to an MS close to the serving BS 301, the MS 309 receives a service with a narrow bandwidth. Another MS 307 is outside the serving BS 301 and thus cannot communicate with the serving BS 301.

The application of a multi-hop relay scheme to both MSs 307 and 309 allows these MSs to receive a better-quality service in the manner of the MSs 311 and 313. As with the MS 309, the MS 311 is at the boundary of the service area of the BS 301. Yet, since a relay station (RS) 303 is located near the MS 311, the MS 311 can receive the service with higher quality than the MS 309 by communicating with the nearby RS 303 without the need for communication with the BS 301, though it is at the boundary of the service area of the BS 301. Like the MS 307, the MS 313 is outside the coverage of the BS 301, and cannot receive a signal or a service from the BS 301. Nonetheless, due to the existence of an RS 305 near the MS 313, the MS 313 can receive a service from the BS 301 via the RS 305.

In this manner, an MS which has difficulty in receiving a service or receives a poor quality service as illustrated in FIG. 2 can communicate with its serving BS outside the coverage area of the serving BS or receive a good-quality service from the serving BS through relaying of an RS as illustrated in FIG. 3.

Accordingly, there exists a need for reconfiguring the MOB_NBR-ADV message for effective communications among an MS, a BS and an RS in a multi-hop relay BWA communication system, when the pilot channel scanning procedure of FIG. 2 is adopted.

SUMMARY OF THE INVENTION

An object of the present invention is to substantially solve at least the above problems and/or disadvantages and to provide at least the advantages below. Accordingly, an object of the present invention is to provide an apparatus and method in an RS for retransmitting neighbor BS information received from a serving BS in a multi-hop relay BWA communication system.

Another object of the present invention is to provide an apparatus and method in an RS for selecting information about available neighbor BSs from neighbor BS information received from a serving BS, reconfiguring a MOB_NBR-ADV message using the selected neighbor BS information, and transmitting the reconfigured MOB_NBR-ADV message to an MS in a multi-hop relay BWA communication system.

A further object of the present invention is to provide an apparatus and method in an RS for reconfiguring a MOB_NBR-ADV message received from a serving BS by eliminating unnecessary information from the MOB_NBR-ADV message and transmitting the reconfigured MOB-_NBR-ADV message so as to reduce the size of the message and thus save wireless network resources in a multi-hop relay BWA communication system.

The above objects are achieved by providing an apparatus and method for relaying neighbor BS in a multi-hop relay BWA communication system.

According to the present invention, in a BWA communication system for relaying neighbor BS information, a BS transmits a neighbor BS advertisement message to an RS within a cell area of the BS. The RS configures a relay neighbor BS advertisement message by eliminating unavailable neighbor BS information from the neighbor BS advertisement message, and broadcasts the relay neighbor BS advertisement message in a cell area of the RS.

According to the present invention, in a method of relaying neighbor BS information in a BWA communication system, a neighbor BS advertisement message is received and it is determined whether the neighbor BS advertisement message includes unavailable neighbor BS information by checking neighbor BS information in the neighbor BS advertisement message. A relay neighbor BS advertisement message is configured by eliminating the unavailable neighbor BS information from the neighbor BS advertisement message, in the presence of the unavailable neighbor BS information.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail for the sake of clarity and conciseness.

Prior to describing the present invention, it is clarified that the multi-hop relay BWA communication system operates in OFDM and/or OFDMA. Hence, the multi-hop BWA communication system enables high-speed data transmission due to transmission of a physical channel signal on a plurality of subcarriers, and supports mobility of MSs by a multi-cell structure. Herein, "BS MOB_NBR-ADV" refers to a MOB_NBR-ADV message sent by a BS (or a serving BS) and "RS MOB_NBR-ADV" refers to a MOB_NBR-ADV message sent by an RS.

Figure 4:
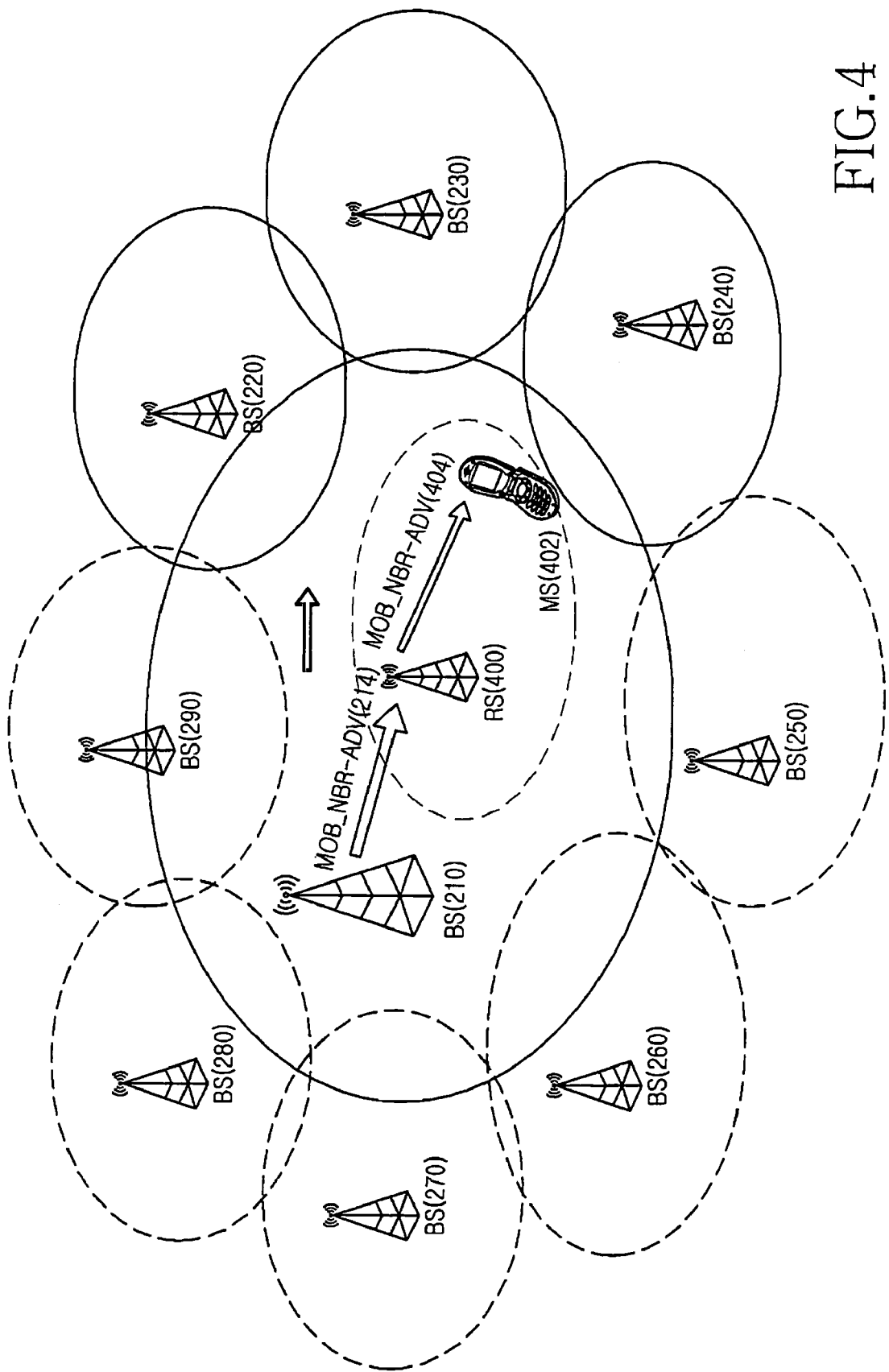
FIG. 4 illustrates an operation for relaying neighbor BS information in an RS in the multi-hop relay BWA communication system according to the present invention.

FIG. 4 illustrates an operation for relaying neighbor BS information in an RS in the multi-hop relay BWA communication system according to the present invention.

Referring to FIG. 4, the serving BS 210 collects information about neighbor BSs and broadcasts the BS MOB_NBR-ADV message 214 including the information about neighbor BSs within its cell. Upon receipt the BS MOB_NBR-ADV message 214, an RS 400 separates a neighbor BS list included in the BS MOB_NBR-ADV message 214 into available neighbor BS information and unavailable neighbor BS information.

The available neighbor BS information is information about the neighbor BSs 220, 230 and 240 near to the RS 400, and the unavailable neighbor BS information is information about the neighbor BSs 250 to 290 remote from the RS 400 in the BS MOB_NBR-ADV message 214.

The RS 400 eliminates the unavailable neighbor BS information from BS MOB_NBR-ADV message 214 and configures a relay MOB_NBR-ADV message 404 with the available neighbor BS information. The RS 400 then sends the relay MOB_NBR-ADV message 404 in the cell coverage of the RS 400 so that an MS 402 can acquire the neighbor BS information by the relay MOB_NBR-ADV message 404. If the BS MOB_NBR-ADV message 214 contains only the available neighbor BS information, the RS 400 forms the relay MOB_NBR-ADV message 404 with the available neighbor BS information and neighbor BS information managed by the RS 400 without any reconfiguration of the BS MOB_NBR-ADV message 214, or broadcasts the BS MOB_NBR-ADV message 214 as the relay MOB_NBR-ADV message 404 to the MS 402.

The manner in which the RS 400 detects the available neighbor BS information from the BS MOB_NBR-ADV message 214 includes many ways, and its detailed description is not provided herein. It is also assumed that the RS 400 has neighbor BS information or neighbor RS information.

Figure 5:
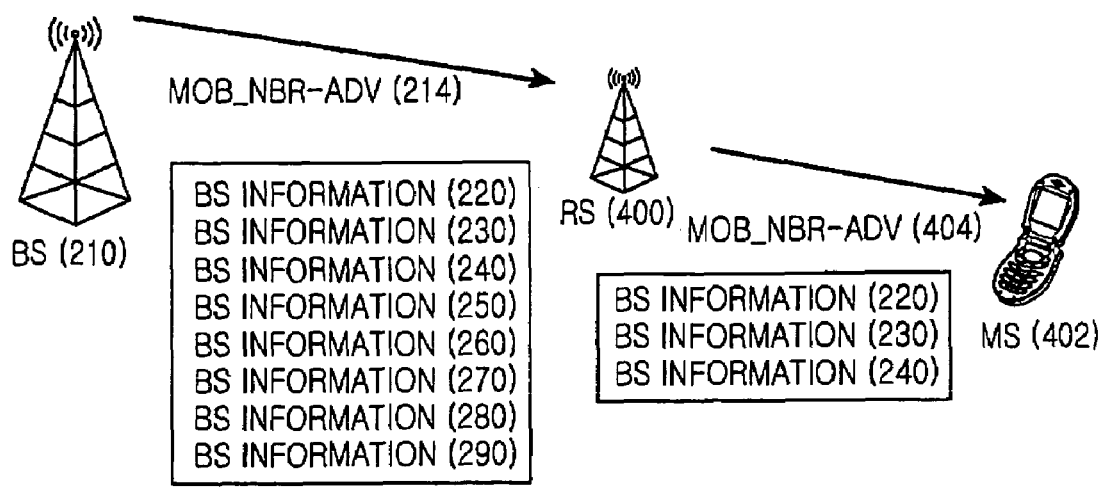
FIG. 5 illustrates an operation for reconfiguring and transmitting the MOB_NBR-ADV message in the RS in the multi-hop relay BWA communication system according to the present invention.

FIG. 5 illustrates an operation for reconfiguring and transmitting the MOB_NBR-ADV message in the RS in the multi-hop relay BWA communication system according to the present invention.

Referring to FIG. 5, the BS MOB_NBR-AVD message 214 broadcast from the serving BS 210 contains information about all neighbor BSs 220 to 290. The RS 400 configures the relay MOB_NBR-ADV message 404 with information about the neighbor BSs 220, 230 and 240 near to the RS 400, and sends the relay MOB_NBR-ADV message 404 to the MS 402.

Therefore, since the relay MOB_NBR-ADV message 404 delivers only the available neighbor BS information, the size of the message is much smaller than that of the BS MOB_NBR-ADV message 214. As a consequence, radio resources are saved for transmission. The deletion of the information about the neighbor BSs 250 to 290, i.e. the unavailable neighbor BS information does not affect the operation of the MS 402 because the unavailable neighbor BS information is not needed for the MS 402.

Figure 6:
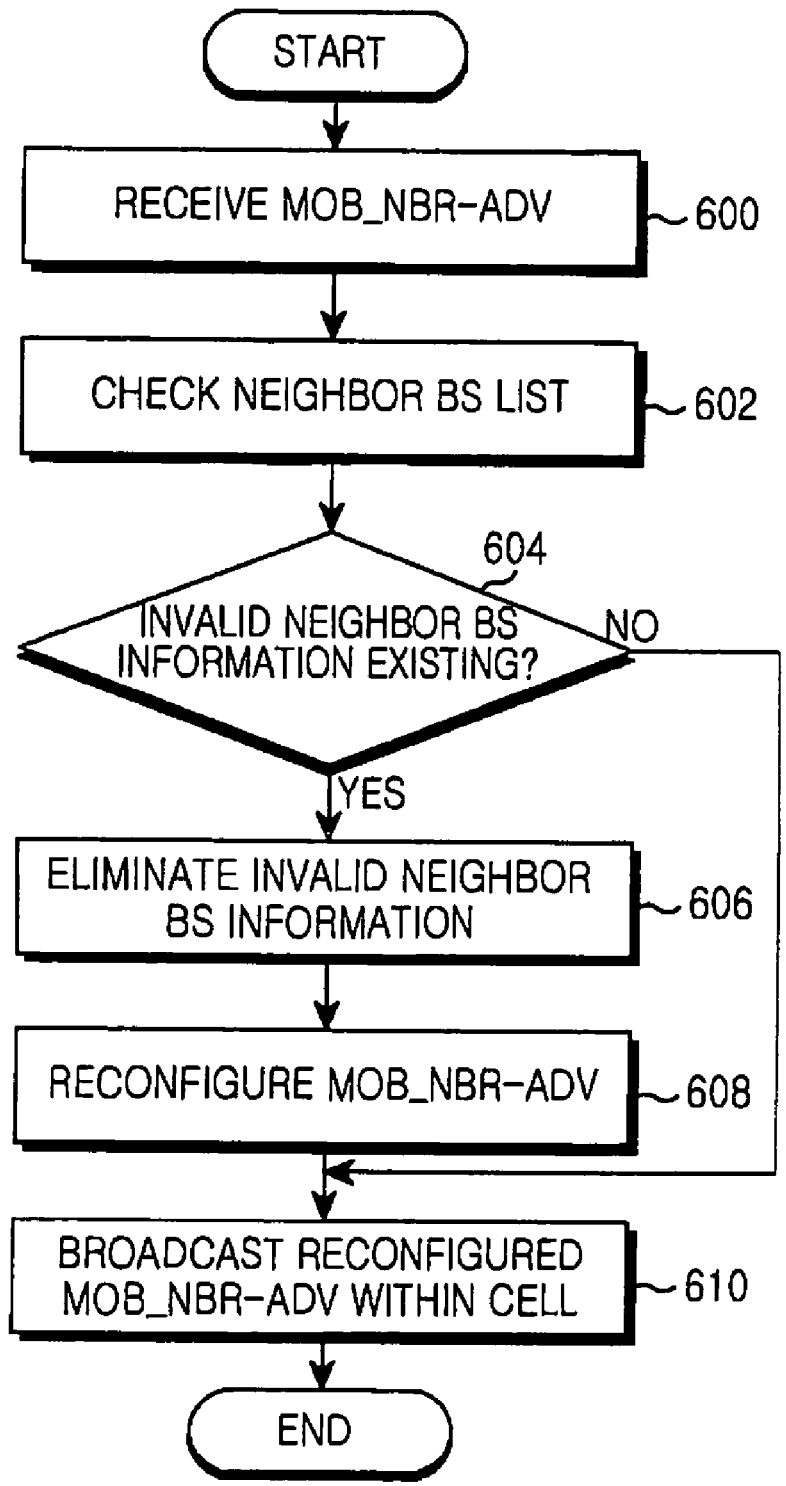
FIG. 6 is a flowchart illustrating an operation for relaying the neighbor BS information in the multi-hop relay BWA communication system according to the present invention.

FIG. 6 is a flowchart illustrating an operation for relaying the neighbor BS information in the multi-hop relay BWA communication system according to the present invention.

Referring to FIG. 6, the RS receives a BS MOB_NBR-ADV message periodically broadcast from the serving BS in step 600. The RS checks a neighbor BS list in the BS MOB_NBR-ADV message in step 602 and determines whether the neighbor BS list includes information about neighbor BSs remote from the RS, i.e., unavailable neighbor BS information in step 604. In the absence of the unavailable neighbor BS information, the RS broadcasts the BS MOB_NBR-ADV message within the cell area in step 610.

In the presence of the unavailable neighbor BS information, the RS deletes the unavailable neighbor BS information from the BS MOB_NBR-ADV message in step 606, configures a relay MOB_NBR-ADV message with the remaining available neighbor BS information only in step 608, and broadcasts the relay MOB_NBR-ADV message within the cell area in step 610.

Figure 1:
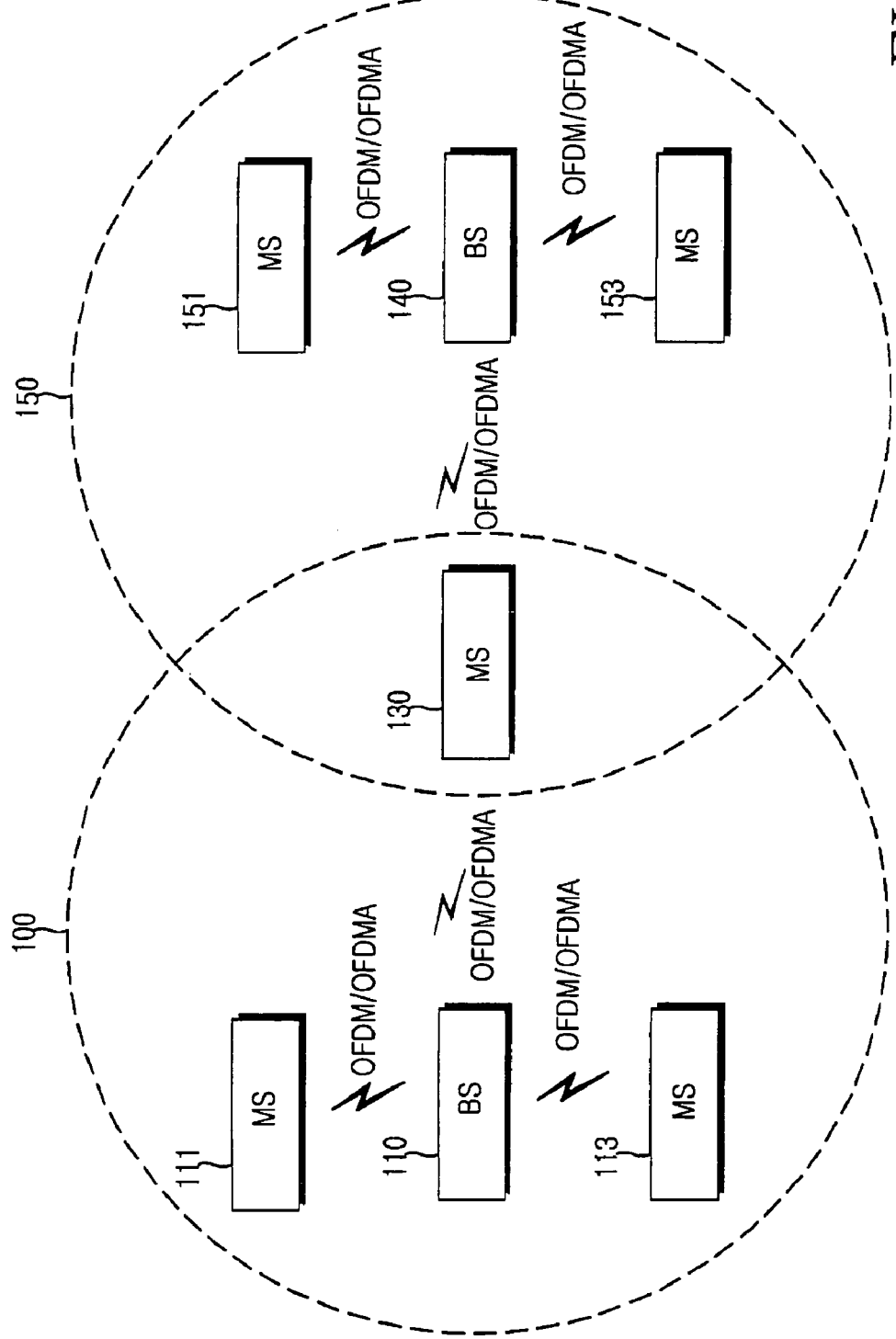
FIG. 1 illustrates the configuration of a conventional IEEE 802.16e communication system.
Figure 2:
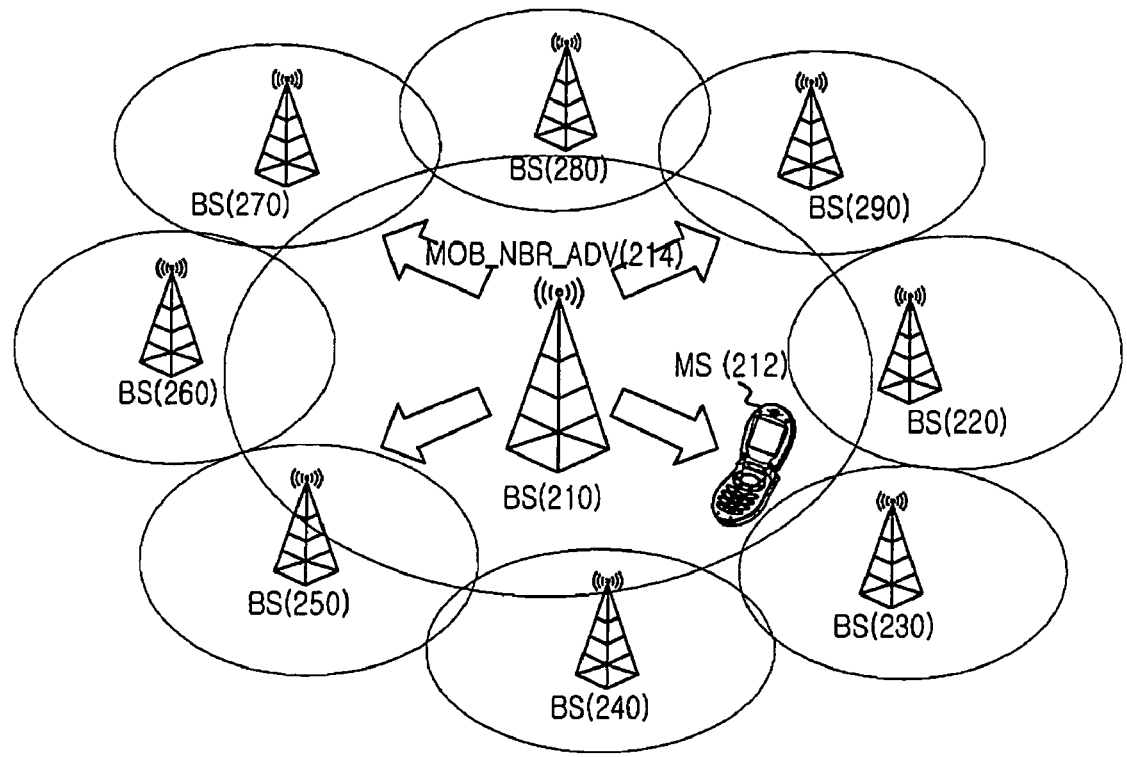
FIG. 2 illustrates an operation for broadcasting a MOB_NBR-ADV message across a cell in the conventional IEEE 802.16e communication system.
Figure 3:
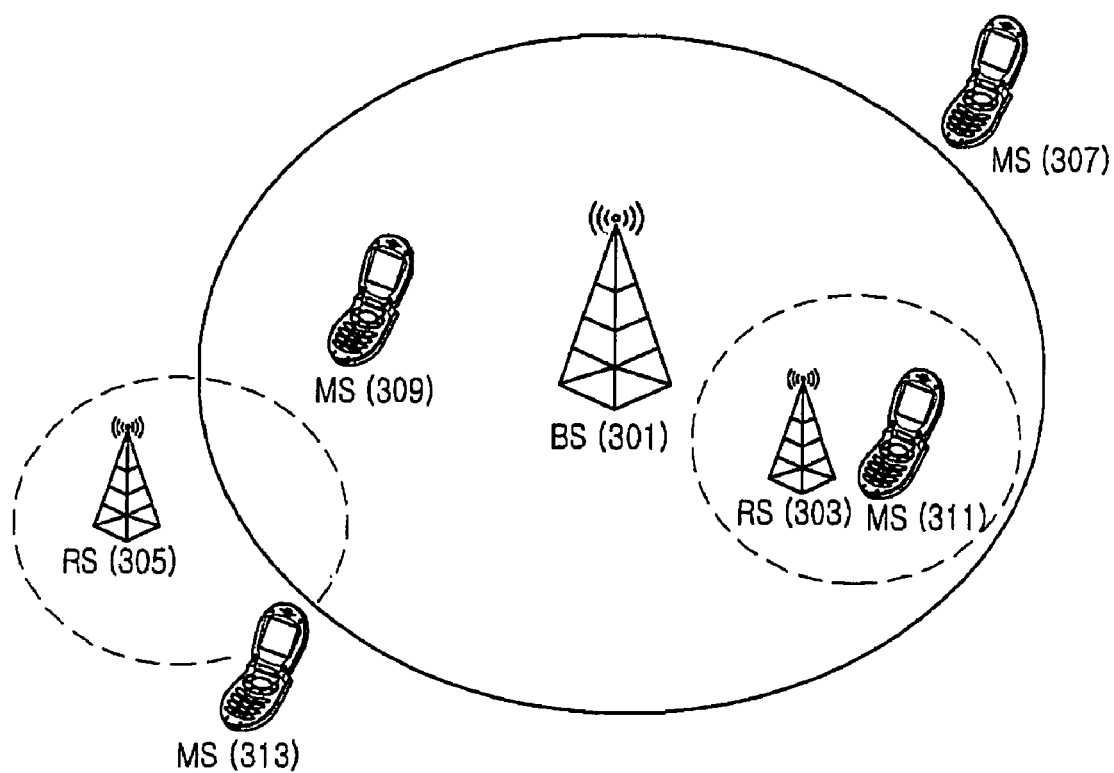
FIG. 3 illustrates the configuration of a conventional multi-hop relay BWA communication system.

The unavailable neighbor BS information is not necessary for the RS due to the difference in cell coverage between the serving BS and the RS. Thus, some neighbor BS close to the serving BS may be remote from the RS. The RS can detect the unavailable neighbor BS information in various ways in step 604. Referring to FIG. 3, in a network including a BS, an RS and an MS, the BS cannot detect the location and direction of the roaming MS, but it can accurately locate the RS because the RS is installed at an installer-set location during network design and serves as a service providing node assisting the function of the BS, managed by the BS. In general, since the serving BS and its neighbor BSs exchange information necessary for a service by exchanging mutual information over a wired/wireless network, the information between the BSs is always currently updated. Hence, the serving BS provides the neighbor BS information to the RS. The RS can simply acquire the neighbor BS information in a typical procedure as done in the conventional mobile communication network, or in other manners. Thus, a description of the neighbor BS information acquisition in the RS is not provided herein.

As described above, an RS separates a MOB_NBR-ADV message received from a serving BS into necessary and unnecessary neighbor BS information, reconfigures the MOB_NBR-ADV message with only the necessary neighbor BS information, and broadcasts the reconfigured MOB_NBR-ADV message. As a consequence, the size of the message is reduced and radio resources are saved.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A wireless access communication system for relaying neighbor Base Station (BS) information, comprising:
   a BS for broadcasting a neighbor BS advertisement message including the neighbor BS information within a cell area of the BS; and
   a Relay Station (RS) for configuring a relay neighbor BS advertisement message by reconfiguring the neighbor BS advertisement message received from the BS, and broadcasting the relay neighbor BS advertisement message in a cell area of the RS,
   wherein the RS reconfigures the neighbor BS advertisement message by eliminating unavailable neighbor BS information or by adding available neighbor BS information managed by the RS.

2. The wireless access communication system of claim 1, wherein the unavailable neighbor BS information is information about neighbor BSs that are near the BS but are a substantial distance away from the RS.

3. The wireless access communication system of claim 1, wherein the RS configures the relay neighbor BS advertisement message without modifying the neighbor BS information.

4. A method of relaying, by a Relay Station (RS) neighbor Base Station (BS) information in a wireless access communication system, comprising the steps of:
   receiving, from a BS, a neighbor BS advertisement message;
   determining whether the neighbor BS advertisement message includes unavailable neighbor BS information by checking neighbor BS information in the neighbor BS advertisement message, or determining whether available neighbor BS information exists by checking neighbor BS information managed by the RS; and
   configuring a relay neighbor BS advertisement message by reconfiguring the received neighbor BS advertisement message,
   wherein reconfiguring the received neighbor BS advertisement message includes eliminating the unavailable neighbor BS information or adding the available neighbor BS information managed by the RS.

5. The method of claim 4, wherein the unavailable neighbor BS information is information about BSs that are near the BS but are a substantial distance away from the RS.

6. The method of claim 4, wherein the RS configures the relay neighbor BS advertisement message without modifying the neighbor BS information.

7. A wireless communication system for relaying neighbor Base Station (BS) information, comprising:
   a BS for broadcasting neighbor BS information; and
   a Relay Station (RS) for reconfiguring the neighbor BS information by eliminating unavailable neighbor BS information in the neighbor BS information received from the BS or adding available neighbor BS information managed by the RS to the neighbor BS information received from the BS, and broadcasting the reconfigured neighbor BS information in a cell area of the RS.

8. The wireless communication system of claim 7, wherein the unavailable neighbor BS information is information about neighbor BSs that are closer to the BS than to the RS.

9. A method of relaying, by a Relay Station (RS) neighbor Base Station (BS) information in a wireless communication system, comprising the steps of:
   receiving, from a BS, neighbor BS information;
   determining whether the neighbor BS information includes unavailable neighbor BS information by checking the received neighbor BS information or determining whether available neighbor BS information exists by checking neighbor BS information managed by the RS; and
   configuring relay neighbor BS information by reconfiguring the neighbor BS information,
   wherein reconfiguring the neighbor BS information includes eliminating unavailable neighbor BS information or adding available neighbor BS information managed by the RS.

10. The method of claim 9, wherein the unavailable neighbor BS information is information about BSs that are closer to the BS than to the RS.

11. A method of relaying, by a Relay Station (RS), neighbor Base Station (BS) information in a wireless communication system, comprising the steps of:

receiving, from a BS, neighbor BS information;
reconfiguring the neighbor BS information by eliminating unavailable neighbor BS information, or by adding available neighbor BS information; and
broadcasting the reconfigured neighbor BS information in a cell area of the RS.

12. The method of claim 11, wherein the unavailable neighbor BS information is information about neighbor BSs that are closer to the BS than to the RS.

* * * * *